Oct. 14, 1941. G. G. GREULICH Re. 21,921

WELDED STRUCTURAL MEMBER

Original Filed Dec. 31, 1936

INVENTOR.
GERALD G. GREULICH,
BY: Usina & Lauber
HIS ATTORNEYS.

Reissued Oct. 14, 1941

Re. 21,921

UNITED STATES PATENT OFFICE 21,921

WELDED STRUCTURAL MEMBER

Gerald G. Greulich, Mount Lebanon, Pa.

Original No. 2,108,373, dated February 15, 1938, Serial No. 118,663, December 31, 1936. Application for reissue December 20, 1939, Serial No. 310,262

5 Claims. (Cl. 189—37)

This invention relates to the production of welded structures by means of a suitable web and a flange welded thereto.

Other objects and advantages will become apparent as the description proceeds, in which.

Figure 4:
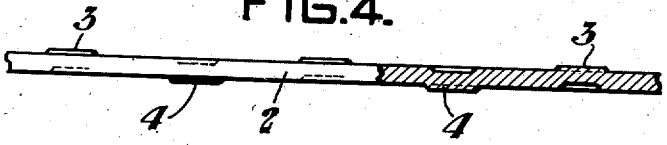
Figure 4 is a detailed section of the web edge.

In the drawing, the numeral 2 designates the web, which is of single thickness of metal. The web may be a plain straight sheet of metal or, if desired, may be provided with a plurality of projections 3 and 4, of any desired shape, extending alternately from each side of said web, as shown in Figure 4.

Figure 1:
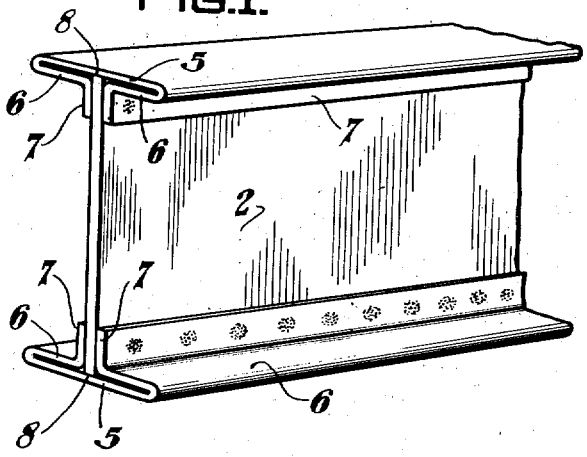
Figure 1 is a perspective view of the assembled structure.
Figure 2:
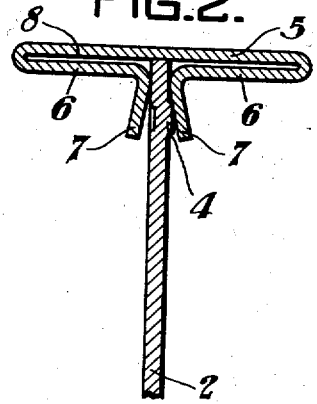
Figure 2 is a detailed transverse sectional view showing the flange and web before welding.
Figure 3:
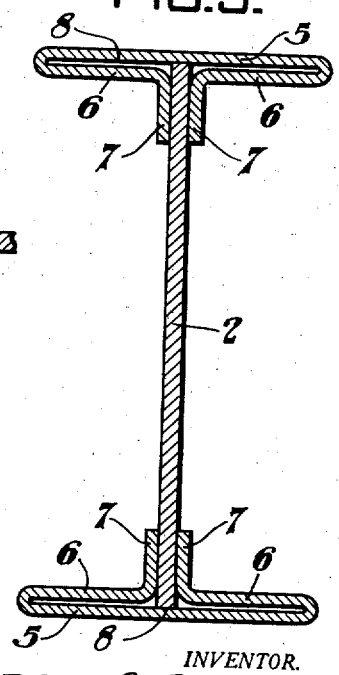
Figure 3 is a detailed sectional view showing the flange and web after welding.

The flanges comprise a single piece of metal having longitudinally extending edge portions which are bent or folded along a longitudinal line back over the intermediate portion of the piece so as to provide an intermediate or outer body portion 5 and an inner body portion 6. The inner body portion 6 is preferably spaced from the outer body portion 5, as shown in Figures 2 and 3, and the extreme outer ends of the piece are bent outwardly to a position substantially perpendicular to the outer body portions 5 and centrally thereof so as to provide outwardly extending portions or wings 7. The outwardly extending portions or wings 7 are substantially parallel to each other and spaced apart preferably a distance slightly more than the thickness of the edge portions of the web 2 so as to provide a longitudinally extending slot or groove therebetween extending throughout the length of the flange.

The web 2 is then positioned in the longitudinally extending slot or groove between the outwardly extending portions 7 of the flange in contact with the inner faces of the same with the edge of the web preferably abutting firmly against the inner face 8 of the intermediate or outer body portion 5. When in such position, the web and both the outwardly extending portions 7 are suitably secured together preferably by being spot welded at the projections 3 and 4, or if the edge portions of the web are flat and straight, the edge portions of the web and the outwardly extending portions 7 are spot welded at various points along the entire length thereof.

While I prefer that the thickness of the metal in the flange be less than the thickness of the metal in the web 2, if desired, the total thickness of the folded flange may be equal to or greater than the thickness of the web. As an example of the ratio of thickness between the single thickness of metal in the flange and the web, I propose that this single thickness of the material from which the flange is formed should range between 70 and 95 per cent. of the thickness of the web metal or the combined total thickness of the doubled-up flange should range from 140 to 190 per cent. of the total web thickness. By such a differential in the web and flange thicknesses, it is possible to obtain unlimited combination of web and flange sizes which permits production of any depth, width and height of beam desired.

Also, it is desired that the web 2 contact the inner face of the outer portion of the flange and, in so doing, reduce the amount of welding required and at the same time produce a beam structure having suitable advantages over the beams of the present construction.

The principle involved herein may be applied with web members and flange members of other shapes. It also may be applied to other structural members having a web and a flange or flanges welded thereto, such as, for example, T's and other common types.

While I have shown and described a specific embodiment of the invention, it is to be understood that I do not wish to be limited exactly thereto, since various modifications may be made without departing from the scope of the invention, as defined in the following claims.

I claim:

1. A structural member comprising at least one flange formed from a single piece of metal bent back upon itself to provide a double thickness of metal in spaced relationship and including laterally extended portions from the inner portion of said flange and a web provided with a plurality of projections extending alternately from each side thereof positioned between said laterally extended portions and welded thereto at the points said projections contact said laterally extended flange portions, said web adapted to project beyond the inner portion of said flange to contact the inner face of the outer portion thereof.

2. The method of making a metal beam which includes making a metal beam web in the form of an elongated strip of metal having opposite edge portions, making a unitary metal beam flange comprising laterally opposite integrally connected longitudinally extending flange portions, with a longitudinally extending wing on each flange portion, and with the wings spaced apart to provide a longitudinally extending aperture between the wings, inserting an edge portion of the web into the aperture to dispose opposite faces of the sheet metal edge portion adjacent to and between the wings, and welding the web edge portion to the wings on longitudinally extending portions between the web edge portion faces and the wings.

3. The method of making a beam which includes forming an elongated sheet metal web having longitudinally extending edge portions, forming an elongated unitary sheet metal flange comprising laterally opposite integrally connected flange portions and an inwardly open groove extending longitudinally therealong, seating an edge portion of the web in the groove and welding the edge portion of the web to the side walls of the groove.

4. The method of making a beam which includes forming an elongated sheet metal web having a longitudinally extending substantially flat edge portion, forming a unitary elongated sheet metal flange having longitudinally extending wings thereon, with the wings spaced apart to provide a longitudinally extending groove between the wings having substantially parallel side walls, inserting the edge portion of the web into the groove with opposite faces of the edge portion of the web substantially engaging the side walls of the groove and welding the faces of the web edge portion to the side walls of the groove.

5. The method of making a beam which includes forming an elongated sheet metal web having a longitudinally extending edge portion, forming an elongated unitary sheet metal flange comprising integrally connected, laterally opposite, longitudinally extending flange portions and longitudinally extending wings integrally connected with the flange, and with the wings spaced apart to provide a longitudinally extending groove between the wings and the grooves having confronting side walls, inserting the edge portion of the web into the groove with opposite faces of the edge portion of the web substantially engaging the side walls of the groove, and welding the faces of the web edge portion to the side walls of the groove.

GERALD G. GREULICH.